US012069413B2

(12) United States Patent
Ishizu (10) Patent No.: US 12,069,413 B2
(45) Date of Patent: Aug. 20, 2024

(54) IMAGING APPARATUS CAPABLE OF TRANSMITTING IMAGE DATA TO AN EXTERNAL APPARATUS, CONTROL METHOD THEREOF, AND STORAGE MEDIUM

(71) Applicant: CANON KABUSHIKI KAISHA, Tokyo (JP)

(72) Inventor: Akihiko Ishizu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 19 days.

(21) Appl. No.: 17/853,003

(22) Filed: Jun. 29, 2022

(65) Prior Publication Data

US 2023/0007216 A1    Jan. 5, 2023

(30) Foreign Application Priority Data

Jun. 30, 2021    (JP) ................................. 2021-109336

(51) Int. Cl.
| | |
|---|---|
| H04N 7/18 | (2006.01) |
| G06V 10/764 | (2022.01) |
| G06V 40/16 | (2022.01) |
| H04N 23/61 | (2023.01) |
| H04N 23/66 | (2023.01) |
| H04N 23/69 | (2023.01) |
| H04N 23/695 | (2023.01) |

(52) U.S. Cl.
CPC ........... *H04N 7/183* (2013.01); *G06V 10/764* (2022.01); *G06V 40/174* (2022.01); *H04N 23/61* (2023.01); *H04N 23/66* (2023.01); *H04N 23/69* (2023.01); *H04N 23/695* (2023.01)

(58) Field of Classification Search
CPC .... G06V 10/764; G06V 40/174; H04N 23/61; H04N 23/66; H04N 23/69; H04N 23/695; H04N 7/18; H04N 7/183
See application file for complete search history.

(56) References Cited

U.S. PATENT DOCUMENTS

| | | | | |
|---|---|---|---|---|
| 11,627,247 | B2 * | 4/2023 | Kawakami | H04N 23/695 |
| | | | | 348/222.1 |
| 2017/0180625 | A1 * | 6/2017 | Ishizu | H04N 23/661 |
| 2020/0228692 | A1 * | 7/2020 | Wakamatsu | H04N 23/6812 |

FOREIGN PATENT DOCUMENTS

JP         2019106694 A    6/2019

* cited by examiner

*Primary Examiner* — Antoinette T Spinks
(74) *Attorney, Agent, or Firm* — Canon U.S.A., Inc. IP Division

(57) ABSTRACT

An imaging apparatus includes an imaging unit configured to image a subject, a transmission unit configured to transmit image data to an external apparatus, a subject search unit configured to automatically search for a subject and detect the subject, a determination unit configured to determine whether to image a found subject, and a control unit configured to control transmission processing for transmitting the image data and imaging processing by the imaging unit not to be performed in parallel, wherein the subject search unit searches for a subject even during transmission of the image data, and wherein, in a case where the determination unit determines to image the found subject while the image data is transmitted, the transmission unit suspends the transmission of the image data, and the imaging unit images the found subject.

16 Claims, 7 Drawing Sheets

IMAGING APPARATUS CAPABLE OF TRANSMITTING IMAGE DATA TO AN EXTERNAL APPARATUS, CONTROL METHOD THEREOF, AND STORAGE MEDIUM

BACKGROUND OF THE DISCLOSURE

Field of the Disclosure

The present disclosure relates to an imaging apparatus capable of communicating with an external apparatus.

Description of the Related Art

In recent years, an imaging apparatus that can image surroundings without receiving an instruction from a user has been discussed. In addition, the user can transmit an image from the imaging apparatus to an external apparatus such as a server, so that the user can view the image via the server.

Japanese Patent Application Laid-Open No. 2019-106694 discusses an imaging apparatus that transmits a captured image to an external apparatus. This imaging apparatus has an automatic image capturing mode of automatically searching for a subject and capturing an image of the subject by driving pan/tilt and zoom mechanisms, and an image transmission mode of automatically extracting an image expected to meet preference of a user and transmitting the extracted image to the external apparatus.

In Japanese Patent Application Laid-Open No. 2019-106694, however, searching for a subject and automatic image capturing are not performed in the image transmission mode, and thus the imaging apparatus may fail to image a subject.

SUMMARY OF THE DISCLOSURE

According to an aspect of the present disclosure, an imaging apparatus includes an imaging unit configured to image a subject, a transmission unit configured to transmit image data to an external apparatus, a subject search unit configured to automatically search for a subject and detect the subject, a determination unit configured to determine whether to image a subject found by the subject search unit, and a control unit configured to control transmission processing for transmitting the image data by the transmission unit and imaging processing by the imaging unit not to be performed in parallel, wherein the subject search unit searches for a subject even during transmission of the image data by the transmission unit, and wherein, in a case where the determination unit determines to image the subject found by the subject search unit while the image data is transmitted by the transmission unit, the transmission unit suspends the transmission of the image data, and the imaging unit images the subject found by the subject search unit.

Further features of the present disclosure will become apparent from the following description of exemplary embodiments with reference to the attached drawings.

DESCRIPTION OF THE EMBODIMENTS

Exemplary embodiments of the present disclosure will be described below in detail with reference to the attached drawings.

The exemplary embodiments to be described below are examples of a way of implementing the present disclosure, and may be modified or changed depending on a configuration of an apparatus to which the present disclosure is applied and various conditions. In addition, the exemplary embodiments can be combined as appropriate.

<Configuration of Imaging Apparatus>

Figure 1A:
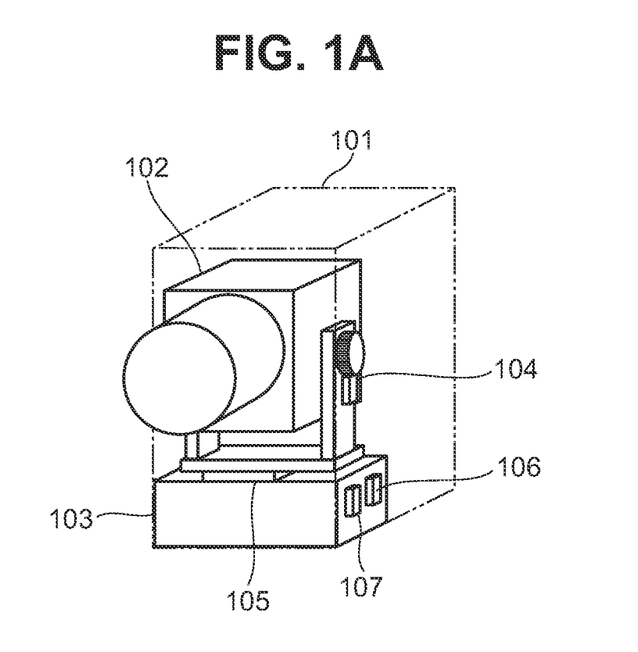
FIG. 1A is a diagram illustrating an example of an external appearance of an imaging apparatus according to an exemplary embodiment.
Figure 1B:
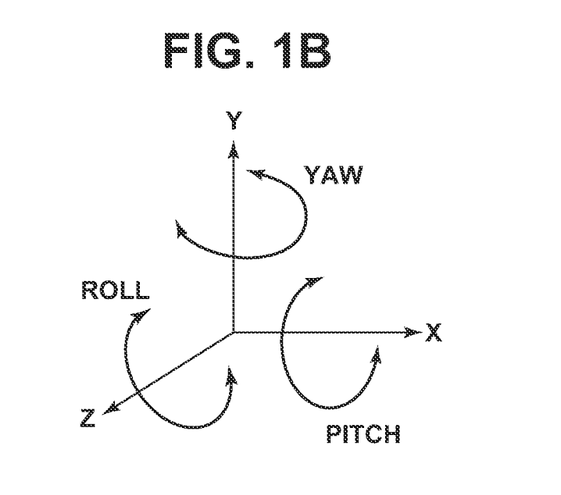
FIG. 1B is a diagram illustrating an operation of the imaging apparatus according to the exemplary embodiment.

FIGS. 1A and 1B are diagrams illustrating a configuration of an imaging apparatus 101 according to an exemplary embodiment.

The imaging apparatus 101 illustrated in FIG. 1A is provided with operation members including a power switch that can be operated to switch between on and off of the power. The operation members also include a touch panel.

A lens barrel 102 is a housing including an optical lens group and an image sensor. The lens barrel 102 is attached to the imaging apparatus 101. A tilt rotation unit 104 and a pan rotation unit 105 form a rotation mechanism that can rotate the lens barrel 102 with respect to a fixed portion 103. The tilt rotation unit 104 is a motor that can rotate the lens barrel 102, for example, in a pitch direction illustrated in FIG. 1B. The pan rotation unit 105 is a motor that can rotate the lens barrel 102, for example, in a yaw direction illustrated in FIG. 1B. The tilt rotation unit 104 and the pan rotation unit 105 can rotate the lens barrel 102 about one or more axes. In the present exemplary embodiment, a Y-axis illustrated in FIG. 1B is a rotation axis of the pan rotation unit 105. Further, in the present exemplary embodiment, the positive direction of a Z-axis illustrated in FIG. 1B is the frontward direction of the imaging apparatus 101.

An angular velocity meter 106 and an accelerometer 107 are, for example, a gyroscope sensor and an acceleration sensor, respectively, and are disposed at the fixed portion 103 of the imaging apparatus 101. The imaging apparatus 101 detects vibration of the imaging apparatus 101, based on a velocity measured by each of the angular velocity meter 106 and the accelerometer 107. The imaging apparatus 101 can generate an image in which shake and tilt in the lens barrel 102 are corrected by rotating the tilt rotation unit 104 and the pan rotation unit 105, based on the detected vibration of the imaging apparatus 101.

Figure 2:
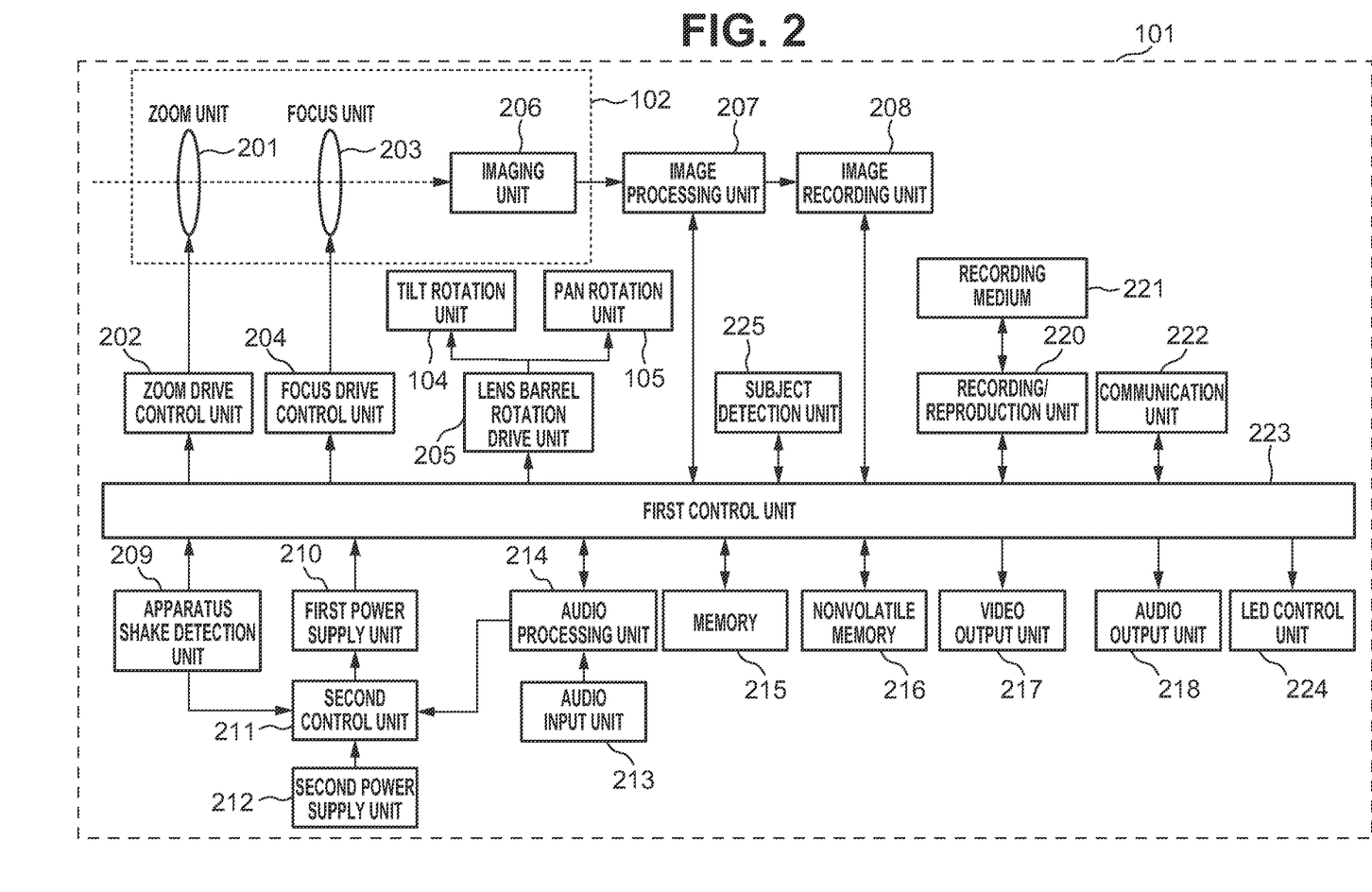
FIG. 2 is a diagram illustrating a configuration of the imaging apparatus according to the exemplary embodiment.

FIG. 2 is a block diagram illustrating a configuration of the imaging apparatus 101 of the present exemplary embodiment.

A first control unit 223 is composed of a processor (such as a central processing unit (CPU), a graphics processing unit (GPU), a microprocessor, or a micro processing unit (MPU)), a memory (such as a dynamic random access memory (DRAM) or a static random access memory (SRAM)), and the like. The first control unit 223 executes various types of processing, thereby controlling each block of the imaging apparatus 101 and controlling data transfer between the blocks. The first control unit 223 is an example of each of a control unit and a determination unit.

A nonvolatile memory 216 is a memory in which data can be recorded and from which data can be erased. Constants, programs, and the like for operating the first control unit 223 are recorded in the nonvolatile memory 216.

A zoom unit 201 is an optical lens group forming a zoom lens for changing the zoom ratio. A zoom drive control unit 202 is a controller for controlling driving of the optical lenses of the zoom unit 201. A focus unit 203 is an optical lens group that adjusts focus.

A focus drive control unit 204 controls driving of the optical lenses of the focus unit 203. An imaging unit 206 receives incident light via each of the optical lens groups by using the image sensor, and outputs information of electric charges corresponding to the amount of the received light to an image processing unit 207, as analog image data. The zoom unit 201, the zoom drive control unit 202, the focus unit 203, the focus drive control unit 204, and the imaging unit 206 are included in the lens barrel 102.

The image processing unit 207 subjects image data input from the imaging unit 206 to image processing such as distortion correction, white balance adjustment, and color interpolation processing, and outputs digital image data. An image recording unit 208 converts the digital image data output from the image processing unit 207, based on an image file format such as a Joint Photographic Experts Group (JPEG) format or a moving image file format such as a Moving Picture Experts Group (MPEG) format. The converted digital image data is transmitted to a memory 215 or a video output unit 217 to be described below. In a case where digital image data recorded in the memory 215 is to be recorded, the first control unit 223 outputs the digital image data to a recording/reproduction unit 220.

A lens barrel rotation drive unit 205 drives the lens barrel 102 in a tilt direction and a pan direction by driving the tilt rotation unit 104 and the pan rotation unit 105. The lens barrel rotation drive unit 205 is an example of a drive unit.

An apparatus shake detection unit 209 is mounted with, for example, the angular velocity meter 106 for detecting an angular velocity in the 3-axis directions of the imaging apparatus 101, and the accelerometer 107 for detecting an acceleration in the 3-axis directions of the imaging apparatus 101. The apparatus shake detection unit 209 calculates a rotation angle of the imaging apparatus 101 and a shift amount of the imaging apparatus 101, based on signals detected by the angular velocity meter 106 and the accelerometer 107.

An audio input unit 213 has a plurality of microphones. Further, the audio input unit 213 performs analog-to-digital (A/D) conversion of audio signals input from the microphones, and outputs the converted signals to an audio processing unit 214.

The audio processing unit 214 can detect the direction of sound on a flat surface where the plurality of microphones is installed. The detected direction of the sound can be used in a search or automatic imaging to be described below. Further, the audio processing unit 214 can recognize a specific audio command. In the present exemplary embodiment, there are two types of specific audio command, which are a trigger word and a command word. The trigger word is a command to be a trigger for starting recognition of the command word. For example, the trigger word is a command including a specific keyword said by a user, such as "OK, camera". The command word is a command for instructing the imaging apparatus 101 to perform predetermined processing. Examples of this predetermined processing include imaging processing for still image, imaging start processing for moving image, imaging termination processing for moving image, sleep processing, changing processing for a subject, and automatic imaging processing. For example, the command word is a command including a keyword varying depending on the predetermined processing, such as "take a still image" if the imaging processing for still image is the intended processing, and "take a moving image" if the imaging start processing for moving image is the intended processing. These audio commands are recorded beforehand in the memory 215 of the imaging apparatus 101. The imaging apparatus 101 may be configured to register an audio command of a user for executing any processing, in addition to the audio commands recorded beforehand.

Further, the audio processing unit 214 performs audio processing such as optimization processing and encoding for an input audio signal. The audio signal processed by the audio processing unit 214 is transmitted to the memory 215 by the first control unit 223. The memory 215 temporarily stores the data input from the image recording unit 208 and the audio signal input from the audio processing unit 214. In a case where this audio signal is to be recorded, the first control unit 223 outputs the audio signal from the memory 215 to the recording/reproduction unit 220.

The recording/reproduction unit 220 records image data, an audio signal, control data about imaging, and the like in a recording medium 221. The recording medium 221 may be a recording medium built in the imaging apparatus 101, or may be a removable recording medium. Various kinds of data such as image data and an audio signal can be recorded in the recording medium 221. In the present exemplary embodiment, the recording medium 221 has a capacity larger than that of the nonvolatile memory 216. Examples of the recording medium 221 include a hard disk, an optical disc, a magneto-optical disk, a compact disc recordable (CD-R), a digital versatile disc recordable (DVD-R), a magnetic tape, a nonvolatile semiconductor memory, and a flash memory.

Further, the recording/reproduction unit 220 can read out (reproduce) image data, audio signals, various data, and programs recorded in the recording medium 221. To reproduce image data and an audio signal recorded in the recording medium 221, the first control unit 223 operates as follows. The first control unit 223 outputs image data and an audio signal read out by the recording/reproduction unit 220 to the image processing unit 207 and the audio processing unit 214, respectively. The image processing unit 207 and the audio processing unit 214 decode the image data and the audio signal, respectively. The image processing unit 207 and the audio processing unit 214 output the decoded data and the decoded signal to the video output unit 217 and an audio output unit 218, respectively.

A second control unit 211 controls supply of power to the first control unit 223. For example, the second control unit 211 consists of a processor (such as a CPU, a microprocessor, or an MPU), and a memory (such as a DRAM or an SRAM). In the present exemplary embodiment, the second control unit 211 is disposed separately from the first control unit 223 that controls the entire main system of the imaging apparatus 101.

A first power supply unit 210 and a second power supply unit 212 supply power for operating the first control unit 223 and power for operating the second control unit 211, respectively. In the present exemplary embodiment, the power supplied by the first power supply unit 210 is greater than the power supplied by the second power supply unit 212. In the present exemplary embodiment, the first power supply unit 210 and the second power supply unit 212 are selected depending on the amount of power to be supplied. For example, the first power supply unit 210 is a switch for supplying power to the first control unit 223, and the second power supply unit 212 is a lithium battery or an alkaline battery. When the power switch of the imaging apparatus 101 is pressed, at first, the power is supplied to the second control unit 211, and subsequently the power is supplied to the first control unit 223.

The imaging apparatus 101 has a sleep state. In the sleep state, the second control unit 211 controls the first power supply unit 210 to turn off the power supply to the first control unit 223. Even in the sleep state where the power is not supplied to the first control unit 223, the second control unit 211 operates, and acquires information from the apparatus shake detection unit 209 and the audio processing unit 214. Based on such input information, the second control unit 211 performs processing for determining whether to activate the first control unit 223.

In a case where the second control unit 211 determines to activate the first control unit 223 (cancel the sleep state), the second control unit 211 controls the first power supply unit 210 to supply the power to the first control unit 223.

The audio output unit 218 outputs, for example, an audio signal such as an electronic shutter sound from a speaker built in the imaging apparatus 101 at the time of imaging. A light emitting diode (LED) control unit 224 controls, for example, an LED disposed in the imaging apparatus 101 to glow or blink in a pattern set beforehand, at the time of imaging.

The video output unit 217 consists of for example, a video output terminal, and outputs an image signal for displaying a video image on a connected external display or the like. The audio output unit 218 and the video output unit 217 may be an integrated single terminal, e.g., an interface such as a High-Definition Multimedia Interface (HDMI®) terminal.

A communication 222 is an interface for communication between the imaging apparatus 101 and an external apparatus. The communication unit 222 has wireless communication modules such as a Bluetooth® communication module, a wireless local area network (LAN) communication module, a wireless universal serial bus (USB) module, and a global positioning system (GPS) receiver.

A subject detection unit 225 reads out image data output from the image processing unit 207, from the memory 215, and recognizes subjects such as a person and an object. For example, in a case where the subject detection unit 225 recognizes a person, the subject detection unit 225 detects the face of the subject. A pattern for determining the face of a subject is registered beforehand in the imaging apparatus 101. This pattern is given an identifier for distinguishing each subject. In subject face detection processing, the subject detection unit 225 detects the face of a subject by detecting a point included in a captured image and matching with the pattern for determining the face of the subject. The subject detection unit 225 can distinguish each of a plurality of registered persons.

At the same time, the subject detection unit 225 also calculates a degree of reliability indicating the probability of the detected face of the subject. The degree of reliability is calculated from, for example, the size of a face area in the image, the level of similarity to a face pattern, and the like. In addition, the subject detection unit 225 can detect face information indicating whether the detected face is a smile, whether eyes are open, the direction of the face, and the like, by performing pattern matching with respect to the face of the subject within the image. The method of detecting the face information is not limited to the pattern matching, and a conventional technique such as a method of utilizing deep learning can be used. The subject detection unit 225 is an example of a detection unit.

Further, in object recognition processing, the subject detection unit 225 can recognize an object by determining whether the object matches with a pattern registered beforehand. In addition, the subject detection unit 225 can recognize an object by extracting a feature amount of a subject, using a histogram of hue, color saturation, or the like within a captured image.

In the above-described methods, the first control unit 223 can detect a subject from captured image data, using the subject detection unit 225.

<System Configuration with External Apparatus>

Figure 3:
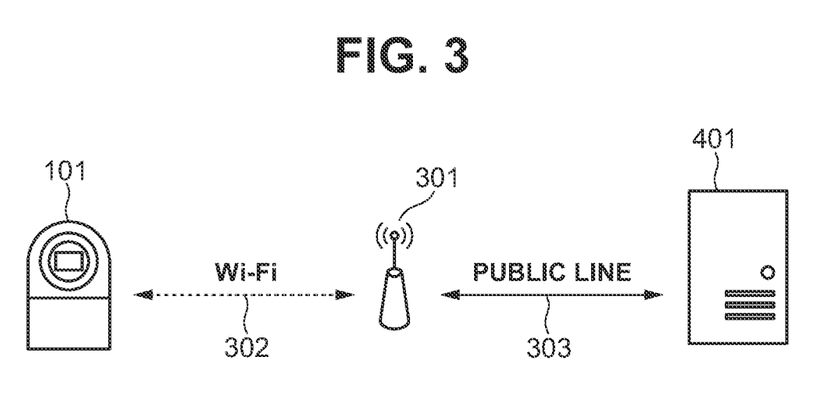
FIG. 3 is a diagram illustrating a configuration including the imaging apparatus and an external apparatus according to the exemplary embodiment.

FIG. 3 is a diagram illustrating an example of a system configuration for the imaging apparatus 101 to communicate with a server 401 via a network and record image data. A configuration of the server 401 will be described below. In the present exemplary embodiment, the address of the server 401 is recorded beforehand in the imaging apparatus 101.

In the present exemplary embodiment, the imaging apparatus 101 and the server 401 are connected via a network router 301 to communicate with each other. In wireless communication 302, the imaging apparatus 101 and the network router 301 take the following connection form. The network router 301 becomes a wireless LAN access point and builds a LAN. The imaging apparatus 101 becomes a wireless LAN client and joins the LAN built by the network router 301. In public communication 303, the network router 301 and the server 401 communicate using a public line such as a fiber-to-the-home (FTTH) line.

In the present exemplary embodiment, the wireless communication 302 is described to be the communication based on the wireless LAN as an example, but the wireless communication 302 may be replaced with wired communication such as Ethernet. In this way, the imaging apparatus 101 connects to and communicates with the server 401 via the wireless communication 302 and the public communication 303.

<Configuration of External Apparatus>

Figure 4:
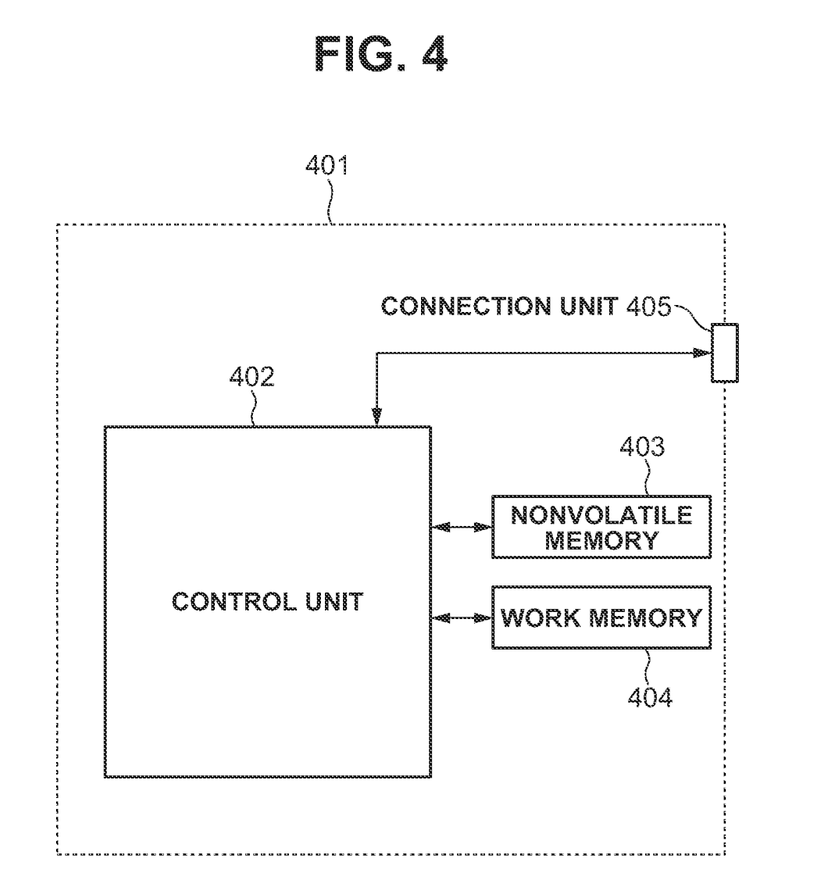
FIG. 4 is a diagram illustrating a configuration of the external apparatus according to the exemplary embodiment.

An example of the configuration of the server 401 serving as an example of the external apparatus will be described with reference to FIG. 4. Here, the server 401 will be described as an example of the external apparatus, but the external apparatus is not limited thereto. The external apparatus may be any type of apparatus if the apparatus has a function of receiving image data from the imaging apparatus 101. For example, the external apparatus may a tablet device, a personal computer, or the like.

A control unit 402 is a processor that controls each component of the server 401 based on an input signal and a program to be described below. The entire apparatus may be controlled by processing shared by a plurality of pieces of hardware (such as a CPU, a GPU, a microprocessor, and an MPU), instead of being controlled by the control unit 402.

A nonvolatile memory 403 is an electrically erasable recordable nonvolatile memory. The nonvolatile memory 403 stores an operating system (OS) that is basic software to be executed by the control unit 402, and an application that implements a practical function in cooperation with the OS. In the present exemplary embodiment, the nonvolatile memory 403 also stores an application for communicating with the imaging apparatus 101.

A work memory 404 is a buffer to be used as a work area or the like of the control unit 402.

A connection unit 405 is a communication interface for connecting to the imaging apparatus 101.

<Automatic Imaging Processing>

The automatic imaging processing is processing in which the first control unit 223 determines timing for imaging and automatically images a subject. In this automatic imaging processing, the first control unit 223 automatically repeats determination of an imaging target subject and imaging of the subject, in a case where the first control unit 223 determines that a satisfactory still image or a satisfactory moving image can be obtained, or in a case where a certain length of time has elapsed. This makes it possible for the user to keep a pleasant scene that suddenly appears in daily life or a casual change in daily life, by imaging such a scene or change using the imaging apparatus 101, without manually performing imaging.

Figure 5:
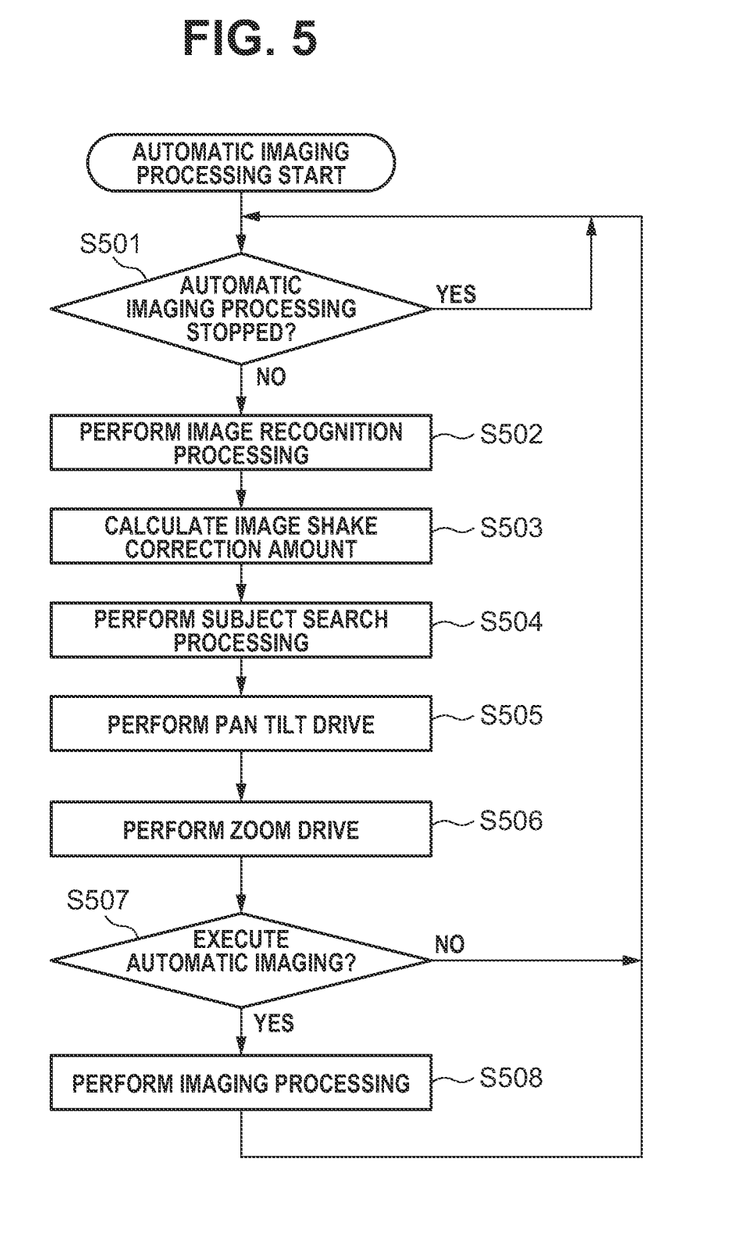
FIG. 5 is a flowchart illustrating automatic imaging processing according to the exemplary embodiment.

FIG. 5 is a flowchart illustrating the automatic imaging processing of the imaging apparatus 101 in the present exemplary embodiment.

The processing of this flowchart starts when the power switch of the imaging apparatus 101 is turned on by the user. In the present exemplary embodiment, connection has been established between the imaging apparatus 101 and the server 401. The first control unit 223 controls each component of the imaging apparatus 101, so that each step of the following flowchart is implemented.

In step S501, the first control unit 223 determines whether the current state is a state where the automatic imaging processing is stopped. The stoppage of the automatic imaging processing will be described in the description of voice recognition processing. In a case where the automatic imaging processing is stopped, the first control unit 223 waits until the stoppage of the automatic imaging processing is canceled. In other words, in a case where the automatic imaging processing is stopped (YES in step S501), step S501 is repeated until the stoppage of the automatic imaging processing is canceled. In a case where the automatic imaging processing is not stopped (NO in step S501), the processing proceeds to step S502.

In step S502, the first control unit 223 causes the image processing unit 207 to perform the image processing on a signal captured by the imaging unit 206, and to generate an image for subject recognition. Further, the first control unit 223 controls the subject detection unit 225 to perform subject recognition such as person recognition and animal recognition, from the generated image for subject recognition. For example, in a case where the subject recognition is performed, a pattern for determining a subject is held beforehand, and the first control unit 223 determines the subject, using the subject detection unit 225, based on the level of similarity between this held pattern and a pattern included in the image for subject recognition. The subject detection unit 225 can thereby identify the subject. The first control unit 223 determines the subject, and also detects the position of the subject in an angle of view.

In step S503, the first control unit 223 calculates an image shake correction amount. Specifically, at first, the first control unit 223 calculates the absolute angle of the imaging apparatus 101, based on angular velocity and acceleration information acquired in the apparatus shake detection unit 209. Subsequently, the first control unit 223 determines an image stabilization angle for moving the tilt rotation unit 104 and the pan rotation unit 105 in an angular direction for cancelling the absolute angle, as the image shake correction amount.

In step S504, the first control unit 223 performs subject search processing, using a subject search unit that automatically searches for a subject and detects the subject. The subject search processing is composed of the following processes.

(1) Area Segmentation

Figure 6A:
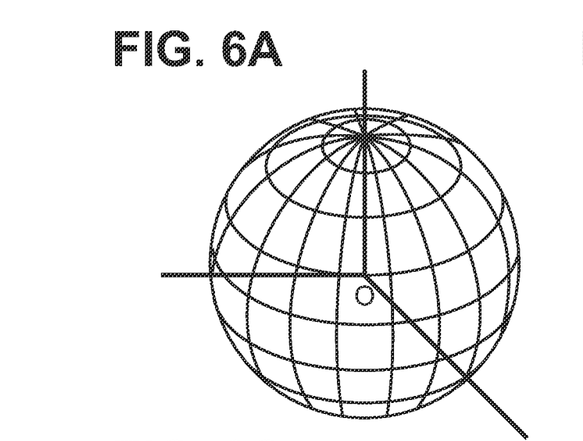
FIGS. 6A to 6D are diagrams illustrating area segmentation within an image according to the exemplary embodiment.
Figure 6B:
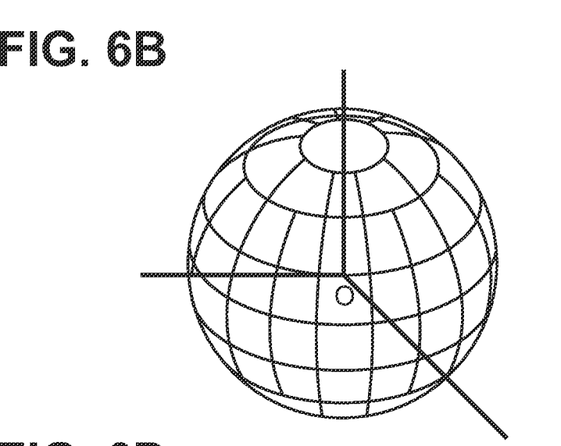
Figure 6C:
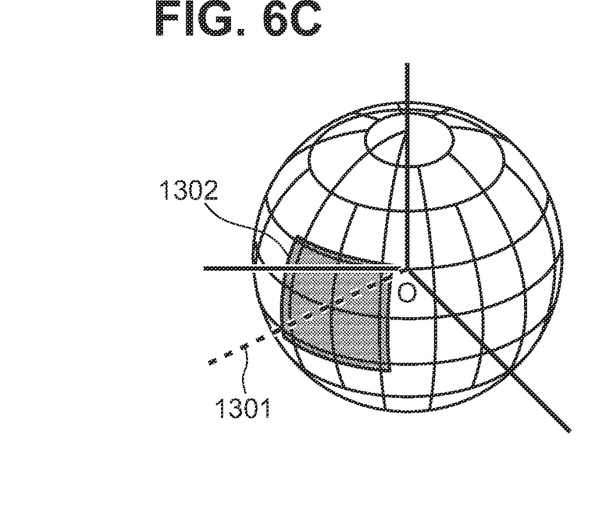

Area segmentation will be described with reference to FIGS. 6A to 6C. In FIGS. 6A to 6C, an area on a spherical surface is segmented using the position of the imaging apparatus 101 as the origin O. In the example in FIG. 6A, the area is segmented at an interval of 22.5 degrees in each of the tilt direction and the pan direction.

In the segmentation in FIG. 6A, as the angle in the tilt direction increases from the zero degree, the circumference in the horizontal direction decreases, and the size of one area also decreases. Therefore, in the imaging apparatus 101 of the present exemplary embodiment, in a case where the tilt angle is 45 degrees or more, an area range in the horizontal direction is set to be divided at an interval of an angle greater than 22.5 degrees, as illustrated in FIG. 6B.

Figure 6D:
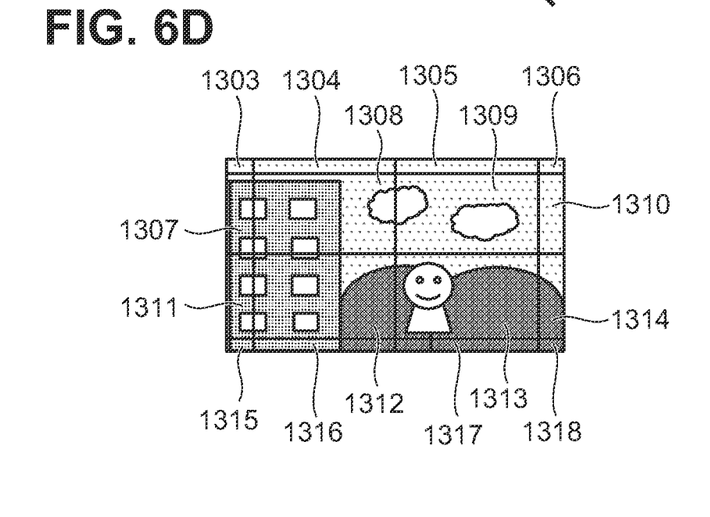

Next, an area in the angle of view of an image captured by the imaging apparatus 101 will be described with reference to FIGS. 6C and 6D. An axis 1301 is a reference direction for the imaging direction of the imaging apparatus 101, and area segmentation is performed based on this direction. The axis 1301 is, for example, an imaging direction when the imaging apparatus 101 is activated, or a direction determined beforehand as a direction to be a reference for an imaging direction. An area 1302 is an angle-of-view area of an image captured by the imaging unit 206. FIG. 6D illustrates an example of a live view image captured by the imaging unit 206 in the area 1302. In the angle of view of the live view image in FIG. 6D, the area of the image is segmented into areas 1303 to 1318, based on the area segmentation illustrated in FIG. 6C.

(2) Calculation of Importance Level for Each Area

For each area obtained by the segmentation described above, an importance level indicating the priority order in searching for a subject is calculated based on a subject present within the area or the situation of the scene of the area. The importance level based on the situation of the subject is calculated based on, for example, the number of subjects present within the area, the size of the face of the subject, the direction of the face of the subject, the probability of the detected face of the subject, the facial expression of the subject, and the result of identifying the subject. Examples of the importance level based on the situation of the scene include a general object recognition result, a scene determination result (such as blue sky, backlight, and evening view), the level of sound from the direction of the area or a voice recognition result, and information about motion detection within the area. Here, the first control unit 223 performs driving to search all around the imaging apparatus 101.

In addition, for example, in a case where the face of a subject is registered, the first control unit 223 raises the importance level of an area where the face of the registered subject is detected. For example, the face of the subject is recorded in the nonvolatile memory 216, as a pattern for determining the subject. In a case where the importance level of the area where the face of the subject is detected is raised, the first control unit 223 returns the importance level of the area to the original importance level, in response to a lapse of a predetermined time, or the execution of imaging a predetermined number of times.

(3) Determination of Search Area

After determining the importance level of each area as described above, the first control unit 223 determines to focus on a search in an area where the importance level is high. Subsequently, the first control unit 223 calculates a pan angle and a tilt angle desirable for imaging of one of the areas where the importance level is high.

In step S505, the first control unit 223 performs pan drive and tilt drive. Specifically, based on the image shake correction amount and the pan angle as well as the tilt angle calculated in step S504, a pan drive amount and a tilt drive amount are calculated. The first control unit 223 then controls the lens barrel rotation drive unit 205 to drive the tilt rotation unit 104 and the pan rotation unit 105, based on the calculated tilt drive amount and the calculated pan drive amount, respectively. In the present exemplary embodiment, the first control unit 223 is described to detect a subject in an area where the importance level is high, and starts imaging the subject, by performing the drive in step S505. Subsequently, the first control unit 223 controls the lens barrel rotation drive unit 205 to track the subject (continue to keep the subject within the angle of view).

In step S506, the first control unit 223 controls the zoom unit 201 to perform zoom drive. For example, the zoom drive is performed based on the state of the subject for which imaging has started in step S505. For example, in a case where the imaged face of the subject is very small in the angle of view, the first control unit 223 performs zooming to the telephoto side to execute imaging so that the face of the subject has an appropriate (larger) size in the angle of view. On the other hand, in a case where the imaged face of the subject is very large in the angle of view, the first control unit 223 performs zooming to the wide-angle side to execute imaging so that the face of the subject has an appropriate (smaller) size in the angle of view. The state suitable for tracking the subject can be maintained by thus performing the zoom control.

In step S504 to step S506, the method of performing the subject search based on the pan drive, the tilt drive, and the zoom drive is described. However, the subject search may be performed in an imaging system that performs omni-directional imaging at a time, by using a plurality of wide-angle lenses. In this case, if the image processing such as subject detection is performed using all the signals obtained by the omni-directional imaging, as an input image, the overall processing load is large. Therefore, in this case, there is provided a configuration in which part of the image obtained by the omni-directional imaging is clipped, and the subject search processing is performed in the range of the clipped image.

In this configuration, the first control unit 223 calculates an importance level for each area in a manner similar to the above-described method, changes the clipping position based on the importance level, and performs determination for automatic imaging to be described below.

This makes it possible to perform a high-speed subject search while reducing the power consumed by the image processing.

In step S507, the first control unit 223 determines whether to perform the automatic imaging using an imaging unit that images a subject.

Here, the determination as to whether to perform the automatic imaging will be described. Whether to perform the automatic imaging is determined based on whether an imaging score exceeds a predetermined value. The imaging score is a parameter to be used for the determination as to whether to perform the automatic imaging. The imaging score is the number of points added based on the situation of detection of a subject and the lapse of time. For example, suppose the automatic imaging is designed to be performed when the imaging score exceeds 2000 points. In this case, at first, the initial value of the imaging score is 0, and points are added as time proceeds, starting from the time when an automatic imaging mode begins. For example, the imaging score increases at an increasing rate to reach 2000 points after a lapse of 120 seconds. In a case where 120 seconds have elapsed without detection of a subject, the imaging score reaches 2000 points based on the point addition due to the lapse of time, and imaging is performed. In addition, 1000 points are added when a subject having high priority is detected by a subject determination unit that determines whether a subject found by the subject search unit is a priority subject, while the time proceeds. For example, the subject having high priority is a subject set by the user as a priority subject to be imaged prior to others, among subjects whose faces are registered in the imaging apparatus 101. In a state where the subject having high priority is detected, 2000 points are easily reached, and consequently, the frequency of imaging readily increases.

Further, for example, in a case where a smile of a subject is recognized, 800 points are added. The points based on a smile are added even if the subject is not given high priority. In the present exemplary embodiment, the case where the number of points to be added based on a smile is constant regardless of whether the detected subject is a subject given high priority is described as an example, but the present exemplary embodiment is not limited to this case. For example, points to be added based on detection of a smile of a subject given high priority may be more than points to be added based on detection of a smile of a subject given low priority. This makes it possible to perform imaging more in line with the intention of a user. If the imaging score exceeds 2000 points owing to the point addition based on facial expression changes such as emotions of these subjects, the automatic imaging is performed. Even if the imaging score does not exceed 2000 points even though points are added based on the facial expression changes, the imaging score quickly reaches 2000 points owing to the point addition based on the lapse of time thereafter.

As for the point addition based on the lapse of time, the case where 2000 points are added in 120 seconds is described as an example. In other words, the case where 2000/120 points are added per second, i.e., points are linearly added with respect to the time, is described. However, the present exemplary embodiment is not limited thereto. For example, the imaging score may be increased as follows. No point is added until 110 seconds of 120 seconds, and 200 points are added per second during 10 seconds from 110 seconds to 120 seconds so that 2000 points are reached. This can prevent the imaging score from reaching the number of points for performing imaging because of the point addition based on facial expression changes of subjects regardless of the priority. In the point addition method in which the number of points linearly increases as the time elapses, the state where points are added based on the lapse of time is long. Therefore, in this method, the number of points for performing imaging is frequently reached even by the point addition based on a change to a smile of a subject having low priority, and the difference in priority is not sufficiently reflected. Nevertheless, if the number of points to be added based on facial expression changes is decreased, the timing of a facial expression change is missed, and thus, it is desirable to avoid taking a measure to decrease the number of points to be added. Therefore, no point is added until 110 seconds. Thus, 110 seconds pass without addition of points for the subject having low priority. Meanwhile, 1000 points are supposed to be added when the subject having high priority is detected, and thus, in a state when the subject having high priority is detected, 1000 points are added even if there is no point addition based on the lapse of time until 110 seconds.

Therefore, in a case where the point addition based on facial expression changes is executed, the possibility of reaching the number of points for performing imaging for the subject having low priority can be reduced as compared with that for the subject having high priority, and the difference in priority easily functions. The facial expression change is described above as an example, but other examples of the criterion for point addition, such as a case where voice becomes louder and a case where a gesture becomes large, are conceivable. For these cases as well, the difference in point addition method described above may be provided so that the difference in priority easily functions.

In addition, even if 2000 points are not exceeded by an action of a subject, imaging is ensured to take place in 120 seconds because of the lapse of time, and therefore, a situation where imaging is not performed at all for a certain period of time is unlikely to occur.

In a case where a subject is detected halfway, the time to start the increase may be moved up, within 120 seconds. In other words, for example, in a case where the subject having high priority is detected when 60 seconds have elapsed, 2000 points are not exceeded even if 1000 points are added thereby, but the linear increase may start after a lapse of 30 seconds following the detection of the subject, instead of stopping the increase until 110 seconds. Alternatively, the linear increase may start 20 seconds before the elapse of 120 seconds, instead of starting 10 seconds before. This increases the possibility of imaging the subject having high priority, so that imaging more in line with the intention of a user is implemented.

When the automatic imaging is performed, the imaging score is reset to zero. The automatic imaging is not performed until 2000 points are exceeded again.

This concludes the description of the determination as to whether to perform the automatic imaging. In a case where the first control unit 223 determines to perform the automatic imaging (YES in step S507), the processing proceeds to step S508. In a case where the first control unit 223 determines not to perform the automatic imaging (NO in step S507), the processing returns to step S501.

In step S508, the first control unit 223 executes the imaging processing. The imaging processing is, for example, still image capturing or moving image capturing.

Next, a classification method for the captured images will be described. The image captured based on the above-described determination as to whether to perform the automatic imaging is not necessarily an image in line with the intention of the user. Therefore, the images are classified by an image classification unit, into a high score (high rating), a middle score (middle rating), and a low score (low rating), based on the time taken before the imaging score exceeds the predetermined value. This classification is used in the calculation and the transmission order of automatic transmission target images, in automatic transmission processing to be described below. The automatic transmission processing will be described in detail below.

As with the above-described case, for example, suppose the automatic imaging is designed to be performed when the imaging score exceeds 2000 points. In this case, at first, the initial value of the imaging score is 0, and points are added as time proceeds, starting from the time when the automatic imaging mode begins. For example, the imaging score increases at an increasing rate to reach 2000 points after a lapse of 120 seconds. In a case where 120 seconds have elapsed without detection of a subject, the imaging score reaches 2000 points based on the point addition due to the lapse of time, and imaging is performed. At this moment, no subject is detected, and thus it is difficult to regard the obtained image as an image in line with the intention of the user. Therefore, the image is classified as the low score, in a case where the time taken before the imaging score exceeds the predetermined value is 120 seconds or more. For example, when a subject having high priority is detected while the time proceeds, 1000 points are added. In a case where a specific facial expression such as a smile or a crying face of a subject is recognized, 800 points are added. On the other hand, in a case where a subject has a facial expression lacking emotion such as an expressionless face, no point is added for rating. Even if the subject having high priority is detected, if there is no point addition based on the detection of a smile or the like, 2000 points are reached after a lapse of 60 seconds by the point addition based on the lapse of time, and imaging is performed. It is conceivable that, even if the subject having high priority is imaged, if a scene with a poor change is obtained, the image is not sufficiently in line with the intention of the user. Therefore, in a case where the time taken before the imaging score exceeds the predetermined value is 60 seconds or more and less than 120 seconds, the image is classified as the middle score.

In a case where the subject having high priority is detected while the time proceeds, and there is point addition based on other factor, the predetermined value is exceeded in less than 60 seconds. It is conceivable that the larger the number of points added based on various factors is, the shorter the time taken before the imaging score exceeds the predetermined value is. Therefore, in a case where the time taken before the imaging score exceeds the predetermined value is less than 60 seconds, the image is classified as the high score.

This concludes the description of the classification method for the captured images. In the present exemplary embodiment, the image is classified as a higher rating, as the time taken before the imaging score exceeds 2000 points is shorter, but the present exemplary embodiment is not limited thereto. The imaging apparatus 101 may determine the image to be a high score image, in a case where imaging is performed in a state where the subject having high priority is detected. Further, the imaging apparatus 101 may determine the image to be a high score image, in a case where the imaging score exceeds the predetermined value because of point addition based on a facial expression of a subject or a change in facial expression, and imaging is performed. Furthermore, these may be combined, and any type of classification method may be employed if an image in line with the intention of a user is classified as the high score.

This concludes the description of the automatic imaging processing of the imaging apparatus 101 in the present exemplary embodiment. Such processing for automatically imaging a subject enables the imaging apparatus 101 to capture an image of a scene desired by a user or a moving image, without receiving an imaging instruction from the user.

<Automatic Transmission Processing>

Figure 7:
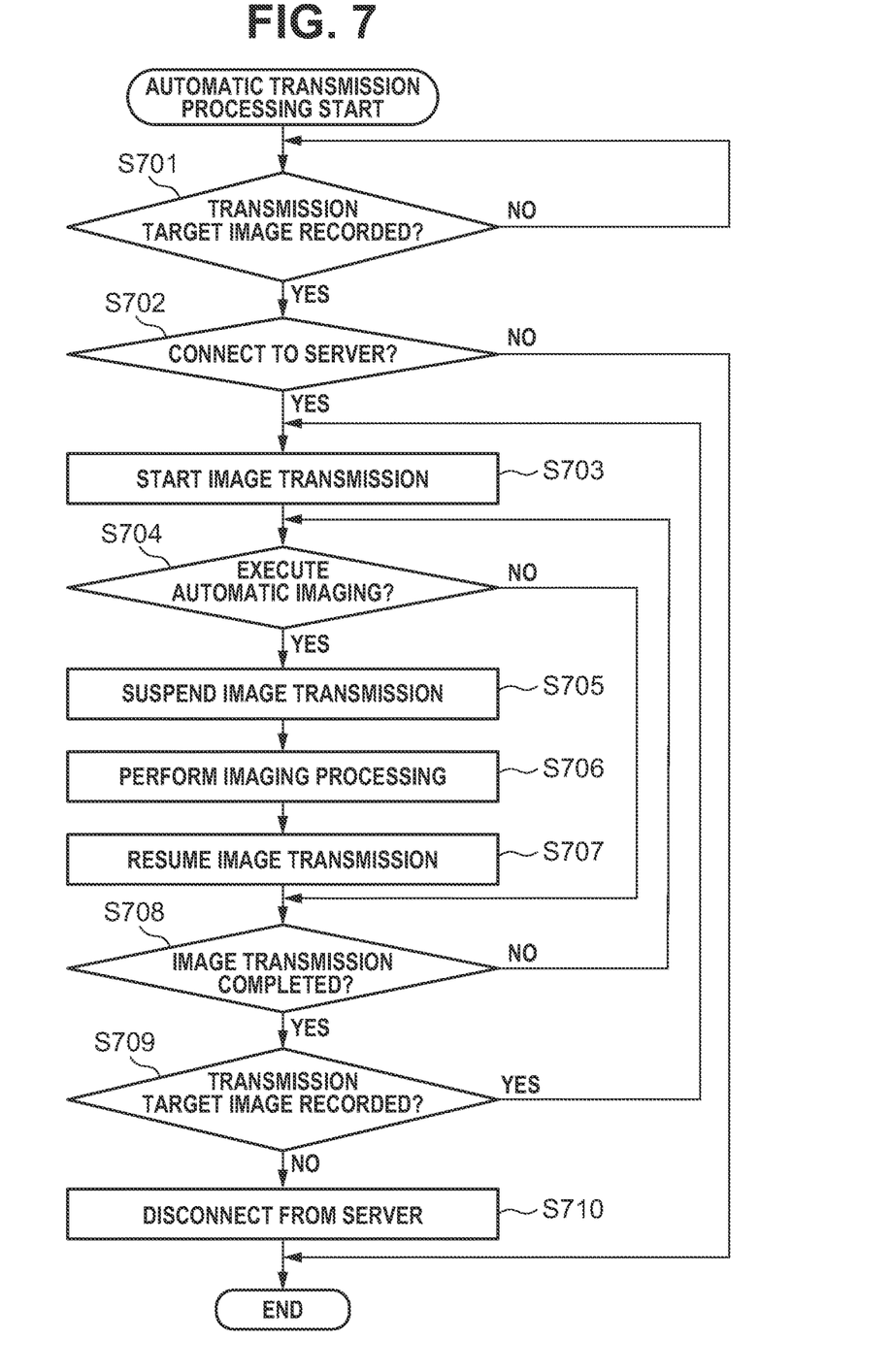
FIG. 7 is a flowchart illustrating automatic transmission processing according to the exemplary embodiment.

FIG. 7 is a flowchart illustrating the automatic transmission processing of the imaging apparatus 101 in the present exemplary embodiment.

The processing of this flowchart starts when the recording of image data to be transmitted to the server 401 is detected. Further, in the present exemplary embodiment, the processing of this flowchart is executed in parallel with the automatic imaging processing illustrated in FIG. 5. The first control unit 223 executes a program recorded in the nonvolatile memory 216, so that this processing is implemented.

In step S701, the first control unit 223 determines whether image data to be transmitted to the server 401 is recorded in the recording medium 221. Here, the transmission target image data is image data classified as the high score or the middle score by the above-described image classification unit, among image data that has not been transmitted to the server 401. The reason why the image of the low score is not transmitted here is that the image of the low score is, conceivably, more likely to be unnecessary image data for the user. In a case where the transmission target image data is recorded (YES in step S701), the processing proceeds to step S702. In a case where the transmission target image data is not recorded (NO, in step S701), step S701 is repeated.

In a case where the automatic imaging processing illustrated in FIG. 5 is executed in parallel, and this step is executed after a new transmission target image is captured, the image data of this image is detected as the transmission target image data.

In step S702, the first control unit 223 joins the LAN built by the network router 301, and connects to the server 401 serving as the external apparatus, via the communication unit 222. The first control unit 223 then determines whether the imaging apparatus 101 is successfully connected to the server 401.

In a case where the connection between the imaging apparatus 101 and the server 401 is completed (YES in step S702), the processing proceeds to step S703. In a case where the imaging apparatus 101 fails to connect to the LAN built by the network router 301 or fails to establish connection with the server 401 (NO in step S702), the processing of this flowchart ends.

In step S703, the first control unit 223 starts transmission of the image data to the server 401 via the communication unit 222. After this step, the first control unit 223 keeps transmitting the image data until the transmission of the transmission target image data is completed, except when the transmission of the image data is suspended as will be described below.

Here, the order in which the first control unit 223 transmits the image data will be described. In the present exemplary embodiment, the first control unit 223 transmits the image data in descending order of score. The image data recorded in the recording medium 221 is classified into at least the high score, the middle score, and the low score by the above-described image classification unit. The image data is transmitted in such an order for the following reason. For example, in a case where imaging based on the automatic imaging processing is performed for a long time in a state where connection to the server 401 is not established, this results in a state where a large amount of transmission target image data is recorded in the recording medium 221. In a case where the imaging apparatus 101 transmits the image data in order based on the image capturing date and time in this state, this can lead to a situation where image data of the high score, which is likely to be image data the user wants to view, is not quickly transmitted to the server 401. However, naturally, in a case where the user views image data recorded in the server 401 before the transmission of all the image data is completed, the user cannot view the image data that has not been transmitted to the server 401. Therefore, in a case where image data having the latest (or oldest) image capturing date and time is the image data the user most wants to view, the user is forced to wait until the transmission of all the image data of the imaging apparatus 101 is completed, in the method of transmitting the image data in order based on the image capturing date and time. On the other hand, in the case where the image data is transmitted in descending order of score as described above, the user is more likely to acquire the image data the user wants to view, from the server 401, without waiting for the completion of the transmission of the image data to the server 401 by the imaging apparatus 101. Therefore, in the present exemplary embodiment, the first control unit 223 can transmit the image data the user wants to view to the external apparatus prior to the rest, by transmitting the image data starting from the image data of the high score. In addition, in the present exemplary embodiment, the first control unit 223 does not transmit the image of the low score. This is because the image of the low score is unlikely to be an image desired by the user.

Further, in the present exemplary embodiment, the first control unit 223 transmits a still image prior to a moving image. The reason for transmitting the image data in such an order is as follows. The moving image is likely to have a larger file size than that of the still image. In addition, the file size of the moving image increases as the playback time increases. In other words, it is likely that it takes more time to transmit the moving image than to transmit the still image. Therefore, in a case where the moving image is transmitted prior to the still image, since it takes time to transmit the moving image, a situation where none of images including the moving image and the still image is recorded in the server 401 can occur over a long period of time, even if the automatic transmission processing has started. On the other hand, the file size of the still image is uniform, and thus, in a case where the still image is transmitted prior to the moving image, it is less likely that a situation where no still image is recorded in the server 401 continues over a long period of time after start of the automatic transmission processing. Therefore, in the present exemplary embodiment, the first control unit 223 transmits the still image to the server 401 prior to the moving image.

In a case where there is a plurality of image data of the same score, the first control unit 223 transmits the image data, starting from image data having a later image capturing date and time. This is because, if images are sequentially transmitted in the order of image capturing date and time from oldest to newest, a state where an image captured most recently is not transmitted for a long time can occur in a case where a large number of transmission target images are recorded.

In summary, in the present exemplary embodiment, the first control unit 223 transmits the image data in the following order. The image data is transmitted in order of a still image of the high score, a still image of the middle score, a moving image of the high score, and a moving image of the middle score (in a case where there are images of the same score, an image having a later capturing date and time is given higher priority). Since the next imaging processing is not executed, in particular, immediately after imaging, by transmitting the image data in this order, the first control unit 223 can transmit a high-score image desired by the user to the server 401, without suspending the transmission. In step S703, the first control unit 223 determines image data to be transmitted next in the above-described priority order among the image data recorded in the recording medium 221, and starts the transmission of the determined image data.

Incidentally, in the present exemplary embodiment, the imaging apparatus 101 does not perform the imaging processing and the image data transmission processing, simultaneously. This is because a processing load for the imaging processing and a processing load for the image data transmission processing are both large for the first control unit 223, and thus it is efficient for the first control unit 223 to avoid executing these types of processing in parallel. Therefore, in the present exemplary embodiment, subsequent steps S704 to step S707 are executed.

In step S704, the first control unit 223 determines whether to execute imaging in the automatic imaging processing described with reference to the flowchart in FIG. 5. In a case where imaging in the automatic imaging processing is to be executed (YES in step S704), the processing proceeds to step S705. In other words, in a case where imaging in the automatic imaging processing is to be executed during the transmission of the image data, step S705 is performed as interruption processing. The determination as to whether to execute imaging in this step is performed based on a condition similar to that in step S507 in FIG. 5. In the present exemplary embodiment, the first control unit 223 gives higher priority to the imaging processing than to the image data transmission processing. This is because, when imaging is determined to be performed in the automatic imaging processing, a situation at this moment is conceivably suitable for imaging of a subject, and thus so-called missing a shot can occur if imaging is not performed at this moment. In a case where imaging in the automatic imaging processing is not to be executed (NO in step S704), the processing proceeds to step S707.

In step S705, the first control unit 223 suspends the transmission of the image data to the server 401.

In step S706, the first control unit 223 executes imaging processing in the automatic imaging processing. The imaging processing is, for example, still image capturing or moving image capturing. In other words, this step is similar to step S508 in FIG. 5.

In step S707, the first control unit 223 resumes the suspended transmission of the image data, via the communication unit 222, and the processing proceeds to step S708.

Here, suspending the transmission of the image data results in a state where the image data being transmitted to the server 401 is held in an imperfect state in the server 401. The server 401 enters a state of waiting for reception of the image data, but in response to a lapse of a predetermined time, the server 401 determines that a communication error has occurred, and disconnects from the imaging apparatus 101. When being disconnected, the server 401 cannot receive the image data, and thus deletes the image data held in the imperfect state. In this case, it is desirable for the imaging apparatus 101 to transmit the image data, which has been in the middle of the transmission, to the server 401 again. Therefore, in order to maintain the connection with the server 401, it is desirable for the imaging apparatus 101 to minimize the time of suspending the transmission of the image data.

For example, in the automatic transmission processing, in a case where there is no increase in the imaging score by the point addition based on detection of a priority subject or a change in facial expression of a subject, the imaging processing is not performed even if the imaging score exceeds the predetermined value based on the lapse of time.

Further, for example, because the imaging apparatus 101 suspends the image data transmission processing during recording of the moving image, the imaging apparatus 101 reduces an imaging duration for the moving image. As a method of reducing the imaging duration, there is a method of setting an upper limit on the imaging duration for the moving image, or reducing the upper limit of the imaging duration when the image transmission is suspended. There is also a method of reducing the upper limit of the imaging duration for the next moving image, in response to disconnection from the server 401 during imaging of the moving image. There is also a method of stopping the automatic imaging processing, when the priority subject is not detected anymore during recording of the moving image.

In this way, the imaging apparatus 101 may change the processing content of the automatic imaging processing, in order to prevent disconnection from the server 401 while the image transmission is suspended.

In step S708, the first control unit 223 determines whether the transmission of the image data being transmitted is completed. In a case where the transmission of the image data being transmitted is completed (YES in step S708), the processing proceeds to step S709. In a case where the transmission of the image data being transmitted is not completed (NO in step S708), the processing returns to step S704, and the automatic transmission of the image data continues.

In step S709, the first control unit 223 further determines whether transmission target image data is recorded in the recording medium 221. In a case where the transmission target image data is recorded in the recording medium 221 (YES in step S709), the processing returns to step S703. In a case where the transmission target image data is not recorded (NO in step S709), the processing proceeds to step S710.

In step S710, the first control unit 223 breaks the connection with the server 401 established via the communication unit 222, and the processing ends.

This concludes the description of the automatic transmission processing for transmitting the image in the present exemplary embodiment.

In the present exemplary embodiment, the example in which the image other than the image of the low score is the transmission target is described, but the present exemplary embodiment is not necessarily limited thereto. For example, the imaging apparatus 101 may transmit the image of the low score to the server 401. In this case, the server 401 classifies the image data according to the score and displays the image data, so that difficulty when the user views the images is reduced. Further, for example, the imaging apparatus 101 may use only the image data of the high score as the image transmission target.

Other Exemplary Embodiments

The present disclosure can also be implemented by processing for supplying a program for implementing one or more functions in the above-described exemplary embodiment to a system or apparatus via a network or a storage medium and causing one or more processors in a computer of the system or apparatus to read and execute the program. The present disclosure can also be implemented by a circuit that implements the one or more functions (for example, an application specific integrated circuit (ASIC)).

The present disclosure is not limited to the above-described exemplary embodiments in unchanged condition, and can be embodied by modifying a component without departing from the gist thereof in an execution phase. In addition, various inventions can be formed by appropriately combining a plurality of components discussed in the above-described exemplary embodiments. For example, some components may be deleted from all the components described in the exemplary embodiments. Further, components of different exemplary embodiments may be combined as appropriate.

According to the exemplary embodiments of the present disclosure, the possibility of failing to image a subject can be reduced in the imaging apparatus that does not execute the imaging processing and the transmission processing in parallel.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-109336, filed Jun. 30, 2021, which is hereby incorporated by reference herein in its entirety.

What is claimed is:

1. An imaging apparatus comprising:
    an imaging unit configured to image a subject;
    a memory; and
    at least one processor configured to communicate with the memory, wherein, the at least one processor is configured to:
    transmit image data to an external apparatus;
    automatically search for a subject and detect the subject;
    determine whether to image a subject found by the subject search unit detected;
    classify an image captured by the imaging unit; and
    control transmission processing for transmitting the image data and imaging processing by the imaging unit not to be performed in parallel,
    wherein a subject is searched for even during transmission of the image data, and
    wherein, in a case where it is determined to image the subject detected while the image data is transmitted, the transmission of the image data is suspended, and the imaging unit images the subject detected,
    wherein the image captured by the imaging unit is classified as a higher rating, as a time taken to search for a subject is shorter,
    wherein an image classified as a lower rating than a predetermined rating is not transmitted to the external apparatus.

2. The imaging apparatus according to claim 1, wherein, when the subject found is a priority subject, it is determined to image the priority subject.

3. The imaging apparatus according to claim 2, imaging is performed in response to a lapse of a predetermined time without detection of the priority subject, when the image data is not transmitted, and imaging is not performed even after the lapse of the predetermined time without detection of the priority subject, when the image data is transmitted.

4. The imaging apparatus according to claim 3, wherein the imaging unit executes the imaging processing in response to the lapse of the predetermined time, when the image data is not transmitted.

5. The imaging apparatus according to claim 3, wherein the at least one processor is further configured to measure the predetermined time,
    wherein the measured time is reset, in response to imaging by the imaging unit.

6. The imaging apparatus according to claim 1, wherein, when the transmission of the image data is suspended, the suspended transmission of the image data is resumed, in response to completion of imaging by the imaging unit.

7. The imaging apparatus according to claim 1, wherein an order of image transmission is controlled, to transmit images starting from an image determined to have a high rating.

8. The imaging apparatus according to claim 7, wherein, when a subject is detected from the image captured by the imaging unit, the image is classified as a higher rating, than when no subject is detected from the image captured by the imaging unit.

9. The imaging apparatus according to claim 7, wherein, when a specific facial expression is recognized from a subject detected from the image captured by the imaging unit, the image captured by the imaging unit is classified as a higher rating.

10. The imaging apparatus according to claim 7, wherein, when images are classified as a same score, transmission of an image having a later image capturing date and time to precede.

11. The imaging apparatus according to claim 7, wherein a still image is controlled to be transmitted prior to a moving image.

12. The imaging apparatus according to claim 1, wherein image data generated by the imaging unit is transmitted to the external apparatus, during a search.

13. The imaging apparatus according to claim 1, wherein the imaging unit sets an upper limit on an imaging duration for capturing a moving image, when the transmission processing for transmitting image data is to be performed during a search.

14. The imaging apparatus according to claim 1, wherein, when the transmission processing for transmitting image data is to be performed during a search, the imaging unit sets a shorter upper limit on an imaging duration for capturing a moving image, than when the transmission processing for transmitting image data is not to be performed during a search.

15. A control method of an imaging apparatus, the control method comprising:
    imaging a subject;
    transmitting image data to an external apparatus;
    performing a subject search of automatically searching for a subject and detecting the subject;
    determining whether to image a subject found in the subject search;
    classifying an image captured by the imaging apparatus; and
    controlling transmission processing for transmitting the image data and imaging processing for imaging the subject not to be performed in parallel,
    wherein, in the subject search, a subject is searched for even during transmission of the image data, and
    wherein, in a case where imaging the subject found by the subject search unit is determined while the image data is transmitted, the transmission of the image data is suspended, and the subject found in the subject search is imaged,
    wherein the image captured is classified as a higher rating, as a time taken to search for a subject search unit is shorter,
    wherein an image classified as a lower rating than a predetermined rating is not transmitted to the external apparatus.

16. A non-transitory computer-readable storage medium which stores a program for causing a computer to execute a method, the method comprising:

imaging a subject;
transmitting image data to an external apparatus;
performing a subject search of automatically searching for a subject and detecting the subject;
determining whether to image a subject found in the subject search;
classifying an image captured by an imaging unit; and
controlling transmission processing for transmitting the image data and imaging processing for imaging the subject not to be performed in parallel,
wherein, in the subject search, a subject is searched for even during transmission of the image data, and
wherein, in a case where imaging the subject found by the subject search unit is determined while the image data is transmitted, the transmission of the image data is suspended, and the subject found in the subject search is imaged,
wherein the image captured is classified as a higher rating, as a time taken to search for a subject search unit is shorter,
wherein an image classified as a lower rating than a predetermined rating is not transmitted to the external apparatus.

* * * * *